US009134873B2

(12) United States Patent
Kies et al.

(10) Patent No.: US 9,134,873 B2

(45) Date of Patent: Sep. 15, 2015

(54) APPARATUS AND METHODS FOR PRESENTING INTERACTION INFORMATION

(75) Inventors: Jonathan K. Kies, Encinitas, CA (US); Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 708 days.

(21) Appl. No.: 13/229,757

(22) Filed: Sep. 11, 2011

(65) Prior Publication Data

US 2012/0075264 A1 Mar. 29, 2012

Related U.S. Application Data

(60) Provisional application No. 61/387,442, filed on Sep. 28, 2010.

(51) Int. Cl.

*G09G 5/00* (2006.01)
*G06F 3/048* (2013.01)
*G06Q 30/02* (2012.01)

(52) U.S. Cl.

CPC ................ *G06F 3/048* (2013.01); *G06Q 30/02* (2013.01); *G09G 5/00* (2013.01)

(58) Field of Classification Search

CPC ....... G06F 3/038; G06F 3/048; G06F 3/0482; G09G 5/00
USPC .......................................................... 345/204
See application file for complete search history.

(56) References Cited

U.S. PATENT DOCUMENTS

| | | | | |
|---|---|---|---|---|
| 5,864,538 | A * | 1/1999 | Chong et al. | 370/236.1 |
| 7,281,042 | B2 * | 10/2007 | Hsu et al. | 709/224 |
| 7,558,754 | B1 | 7/2009 | Singer et al. | |
| 7,681,791 | B1 | 3/2010 | Beveridge | |
| 7,945,662 | B2 * | 5/2011 | Hsu et al. | 709/224 |
| 8,092,381 | B2 * | 1/2012 | Edwards | 600/300 |
| 8,151,280 | B2 | 4/2012 | Sather et al. | |
| 2001/0008404 | A1 | 7/2001 | Naito et al. | |
| 2006/0224402 | A1 * | 10/2006 | Hanna et al. | 705/1 |
| 2007/0204319 | A1 | 8/2007 | Ahmad et al. | |
| 2009/0125462 | A1 * | 5/2009 | Krishnaswamy et al. | 706/12 |
| 2009/0125517 | A1 * | 5/2009 | Krishnaswamy et al. | 707/6 |
| 2009/0133078 | A1 * | 5/2009 | Hamano et al. | 725/87 |
| 2009/0271778 | A1 * | 10/2009 | Mandyam et al. | 717/171 |

(Continued)

FOREIGN PATENT DOCUMENTS

| | | | |
|---|---|---|---|
| GB | 2430507 | A | 3/2007 |
| JP | 2000099441 | A | 4/2000 |

(Continued)

OTHER PUBLICATIONS

International Search Report and Written Opinion—PCT/US2011/053471—ISA/EPO—May 8, 2012.

*Primary Examiner* — Fred Tzeng

(74) *Attorney, Agent, or Firm* — Shirin Tefagh; Joseph Agusta

(57) ABSTRACT

Methods and apparatus for presenting interactable item information include receiving interaction information relating to one or more interactable items. The methods and apparatus may further include calculating a display rate for displaying the interaction information. The display rate is based upon a number of the interaction information occurring during a time period. The methods and apparatus may also include sending a feed with the interaction information and the display rate for generation on an output mechanism.

43 Claims, 10 Drawing Sheets

(56) References Cited

U.S. PATENT DOCUMENTS

| | | | |
|---|---|---|---|
| 2009/0299877 | A1 | 12/2009 | Vadon |
| 2010/0154003 | A1 | 6/2010 | Bi et al. |
| 2010/0198626 | A1 | 8/2010 | Cho et al. |

FOREIGN PATENT DOCUMENTS

| | | | |
|---|---|---|---|
| JP | 2006163911 | A | 6/2006 |
| JP | 2010113448 | A | 5/2010 |
| KR | 20050040101 | A | 5/2005 |
| KR | 20060095457 | A | 8/2006 |
| KR | 20080022080 | A | 3/2008 |
| KR | 20090086625 | A | 8/2009 |
| WO | 02097618 | | 12/2002 |
| WO | WO-2009045899 | A2 | 4/2009 |

* cited by examiner

APPARATUS AND METHODS FOR PRESENTING INTERACTION INFORMATION

CLAIM OF PRIORITY UNDER 35 U.S.C. §119

The present application for patent claims priority to Provisional Application No. 61/387,442 entitled "Apparatus and Methods for Displaying Application Purchase Information" filed Sep. 28, 2010, and assigned to the assignee hereof and hereby expressly incorporated by reference herein.

BACKGROUND

The following relates generally to displaying data, and more specifically to apparatus and methods for presenting content item interaction information.

In today's world, wireless communication systems are widely deployed to provide various types of content, including voice, video, music, text, and data, for example. Wireless devices, such as cellular telephones or handheld devices having wireless connection capability are deployed leveraging the wireless communication system by users for communicating and interacting with each other. Users of wireless devices may purchase and/or download various types of applications, such as social media applications, shopping applications, news applications, games, and sports applications for use on a wireless device. When a consumer is deciding what product to purchase, e.g., a new application for a wireless device, the consumer may make his/her purchasing decision based upon what other applications other consumers have recommended and/or are currently using, purchasing, or downloading. However, when a user is deciding which application to purchase for a wireless device, determining what applications other users are purchasing or using becomes difficult because this information is not readily exposed to the user (unlike clothing, for example, which is easily viewed); wireless devices are inherently personal and do not easily broadcast the content that is on them. Similarly, when we enter a physical store, we see other people and therefore get an idea of its popularity. Wireless devices, however, do not easily expose how many people are shopping in a mobile store. Therefore, it is useful to show a "live purchase feed" of application usage, purchase, or download activity aggregated across a broad base of users. However, because the amount of applications being purchased within a time period may be extremely high (for example, ten applications per second), a display illustrating the applications currently being purchased by users of wireless devices may move so fast that the information becomes blurry and/or is difficult to read. In addition, since space may be limited on a display of a wireless device, it may be difficult to display the content currently being purchased on the displays of wireless devices.

Moreover, users typically purchase applications for wireless devices throughout the day and/or from various locations. In addition, the distribution of applications being purchased by other users may not be linear, such that if the same items are being purchased over and over, then a display showing the applications being purchased may keep repeating the same application over and over without showing the additional applications other users are purchasing. Therefore, it is difficult for a consumer to ascertain which applications other users of wireless devices are currently purchasing in real-time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for presenting interactable item information. The method may include receiving, at a computer, interaction information relating to one or more interactable items. The method may also include calculating a display rate for displaying the interaction information. The display rate is based upon a number of the interaction information occurring during a time period. The method may further include sending a feed with the interaction information and the display rate for generation on an output mechanism.

Another aspect relates to at least one processor configured to present interactable item information. The processor may include a first module for receiving interaction information relating to one or more interactable items. The processor may additionally include a second module for calculating a display rate for displaying the interaction information. The display rate is based upon a number of the interaction information occurring during a time period. Moreover, the processor may include a third module for sending a feed with the interaction information and the display rate for generation on an output mechanism.

Yet another aspect relates to a computer program product. The computer program product may include a computer-readable medium including at least one instruction for causing a computer to receive interaction information relating to one or more interactable items. The computer-readable medium may also include at least one instruction for causing the computer to calculate a display rate for displaying the interaction information. The display rate is based upon a number of the interaction information occurring during a time period. The computer-readable medium may further include at least one instruction for causing the computer to send a feed with the interaction information and the display rate for generation on an output mechanism.

Another aspect relates to an apparatus. The apparatus may include means for receiving, at a computer, interaction information relating to one or more interactable items. The apparatus may further include means for calculating a display rate for displaying the interaction information. The display rate is based upon a number of the interaction information occurring during a time period. In addition, the apparatus may include means for sending a feed with the interaction information and the display rate for generation on an output mechanism.

Yet another aspect relates to an apparatus for presenting interactable item information. The apparatus may include an interaction component operable to receive interaction information relating to one or more interactable items. The apparatus may also include a calculator component operable to calculate a display rate for displaying the interaction information. The display rate is based upon a number of the interaction information occurring during a time period. In addition, the apparatus may include a presenting component operable to send a feed with the interaction information and the display rate for generation on an output mechanism.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
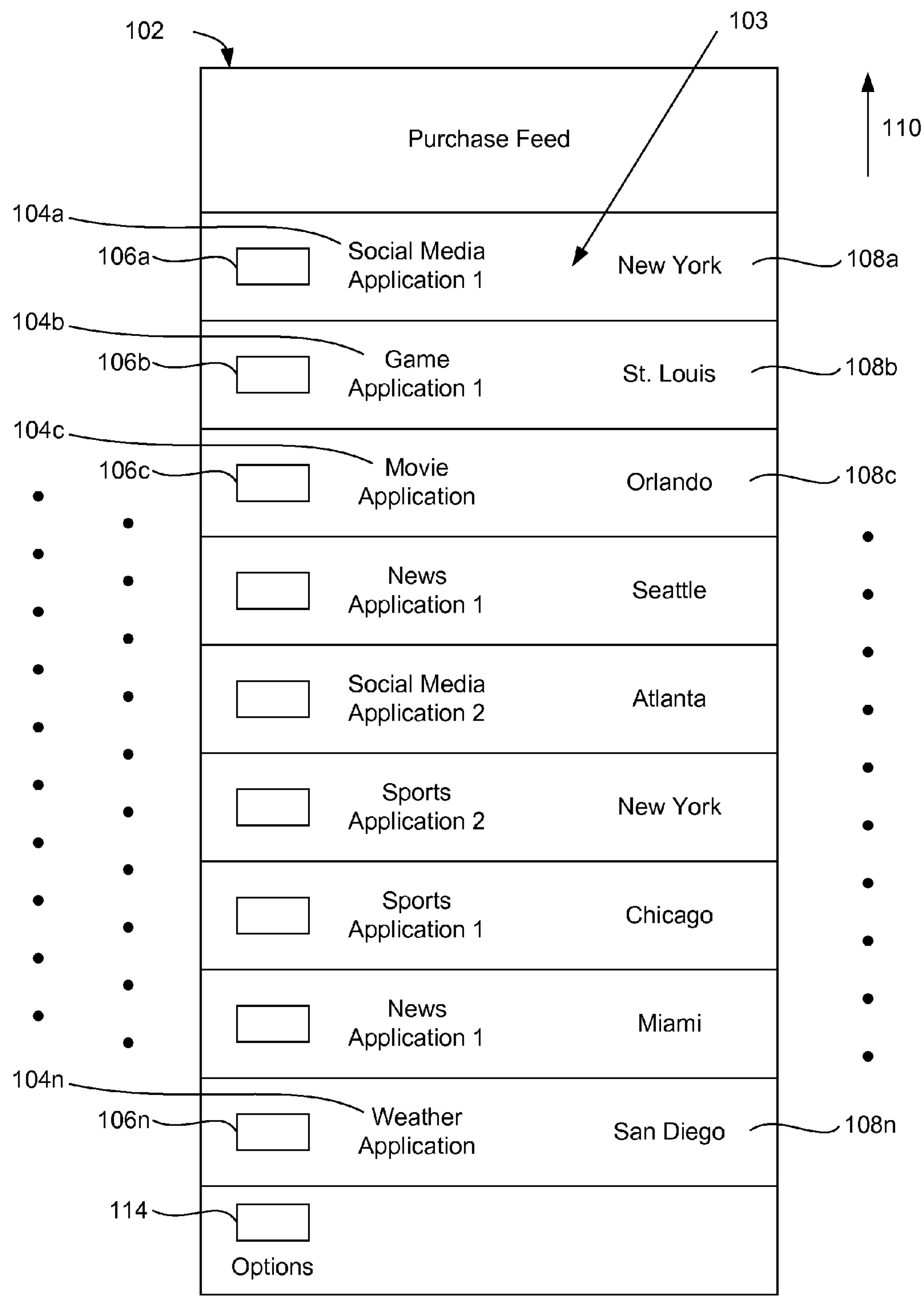
FIG. 1 is an illustration of an interaction feed in accordance with an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and systems for presenting interaction information in real-time, or near real-time, as one or more interactable items, which include content (e.g., applications) and/or services, are being interacted with by one or more users of wireless devices. For example, the interaction information may relate to one or more of downloading, purchasing, accessing, viewing, sharing, recommending, and/or deleting of one or more interactable items by a computer device. Downloading an interactable item may include, for example, receiving the interactable item from another device, e.g. via a wireless or wired communication link, and storing the interactable item in a memory on the wireless device. Purchasing an interactable item may include, for example, the wireless device participating in a transaction to acquire the interactable item from another device, such as in exchange for something of value. Accessing an interactable item may include, for example, the wireless device launching or executing the interactable item, and may include subsequent interaction or use of the interactable item, or accessing may include communicating with a network server. Viewing an interactable item may include, for example, the wireless device presenting the interactable item, or a portion thereof, on a display of the wireless device. Sharing an interactable item may include, for example, the wireless device forwarding the interactable item or forwarding a link or a message or any other mechanism to enable acquiring the interactable item, to another device. Recommending an interactable time may include, for example, the wireless device sending a message, a link, or an indicator or any other mechanism that indicates approval of the interactable item. Deleting an interactable item may include, for example, the wireless device removing the interactable item from a memory of the wireless device, or disabling access to the interactable item.

The described aspects may also relate to determining a display rate for displaying the interaction information so the interaction information is represented on an output mechanism, such as a display, in a manner suitable for a user to comprehend the interaction information, e.g., without having the interaction information move too fast and/or too slow across the display.

The described aspects may further relate to redistributing the interaction information before presentation on the output mechanism, e.g. the display. For example, if one or more interactable items, e.g., content and/or services, are dominating the display, e.g., if a content item and/or service is being displayed over and over, the described aspects redistribute the interaction information to allow additional interaction information for additional interactable items to be included so that a mix of interaction information for different interactable items, e.g. content and/or services, are displayed.

As used in this disclosure, the term "interactable item" may relate to "content" or a "content item" or to a service. As used herein, the term "content" or "content item" includes, at least, one or more of any type of application, multimedia file, image file, executable, program, web page, script, document, presentation, message, data, meta-data, music, video, electronic book, ringtone, wallpaper, an electronic representation of a physical item, or any other type of media or information that may be rendered, processed, or executed on a device.

Also, the term "service" includes, at least, providing of an action or an accommodation, including in electronic or non-electronic form. For example, in one aspect, a service may include providing access, such as access to a network server. For instance, in one aspect that should not be construed as limiting, a use case of providing access to a network server may include a scenario where a user is a player in a game, and access is provided to a network server to enable the user to participate in a network-based multi-player service for the game provided by the network server.

In one aspect, which should not be construed as limiting, the interaction information will be described in the context of an illustrative example relating to displaying application purchase information, also referred to throughout as a feed and/or a purchase feed, and is illustrated in FIG. 1. It should be understood, however, that instead of, or in addition to, the purchase information, the present aspects may include other interaction information, such as download, access, viewing, sharing, recommendation, and/or deletion information. Also, it should be understood that instead of, or in addition to, applications, the present aspects may apply to other types of content, or to services, or to a combination of content and services.

Referring now to FIG. 1, illustrated is an example interaction feed 102 displaying, e.g., in real-time, or almost real-time, interaction information 103 for interactable items currently being purchased, accessed, viewed, shared, recommended, and/or downloaded. In an aspect, interaction feed 102 may be a purchase information feed, and may include, among other information, an aggregated listing of interaction information 103, such as interactable item purchase information, in this example, for interactable items purchased by one or more wireless devices. While the example of FIG. 1 includes interactable items in the form of applications (e.g., social media application, game application, movie application, news application, sports application, weather application, etc.), it should be noted that any type of interactable item may apply. For example, interaction feed 102 may display interaction information 103 for other types of content and/or for services (e.g., playing games, viewing television programs, streaming movies, using social media sites, etc.) currently being accessed by one or more wireless devices. Interaction information 103 may include, but is not limited to, information such as: an interactable item name 104*a*-104*n* describing the interactable item; an icon 106*a*-106*n* illustrating and/or describing the interactable item; a location 108*a*-108*n* describing a geographic or network location where the interaction with the interactable item occurred; ratings for the interactable item (e.g., stars or numbers or text summarizing data relating to the quality and/or performance of the interactable item); prices for the interactable item; and one or more suppliers of the interactable item; as well as any other information relating to a decision to purchase, modify, or delete the interactable item.

It should be appreciated that the interactable items, such as in the form of applications, may include, but are not limited to, social media applications, games, weather applications, news applications, sports applications, electronic book applications, music applications, shopping applications, or any other type of application. Moreover, it should be appreciated that one or more wireless devices may purchase the same interactable item. Thus, interaction feed 102 may have the same interactable item name 104*a*-104*n* displayed in one or more locations 108*a*-108*n*.

In an aspect, the information in the interaction feed 102 may be displayed in real-time, or near real-time, and the interaction information 103 may change over time. For example, in the purchasing aspect, as new interactable items are being purchased, the interactable items displayed near the top of the interaction feed 102, such as interactable item names 104*a*, 104*b*, may be removed from the interaction feed 102 and the newly purchased interactable items may be added to the bottom of the interaction feed 102, such as interactable item name 104*n*. As such, in such an aspect, the interaction feed 102 may scroll in an upward direction 110 as new interactable items are being purchased and as their corresponding interaction information 103 is added to interaction feed 102. It should be noted that other mechanisms for updating a presentation of the interaction information 103 may also be utilized, such as by scrolling in another direction or such as replacing an entire presentation or view of information with a new presentation or view of updated information. Thus, the interaction feed 102 may constantly update the interactable item and interaction information being presented as new interactable items are being interacted with, e.g., in one case, purchased. In an aspect, the rate at which the interaction feed 102 removes and/or adds the interaction information 103, e.g., in this case, the rate for displaying the interactable item purchase information, may be determined based upon the rate of interaction, e.g. purchases, of interactable items within a time period, as discussed in more detail below in FIGS. 2 and 4.

Therefore, in the purchase scenario, the interaction feed 102 may display which interactable items are currently being purchased within a time period.

In an optional aspect, interaction feed 102 may also include an options button 114 that the user may select for filtering the interaction information 103 displayed on the interaction feed 102. The user may filter the interaction information 103 based upon, for example, one or more of: the user's interactable item preferences; regional controls; demographic controls; interactable item prices; interactable item ratings; or based on the purchasing profile of users who have purchased similar interactable items; among other filters. Interactable item preferences may include, but are not limited to, item types, such as ringtones, games, and/or applications (e.g., weather, sports, shopping, news, and social media), or the genre of the interactable item, such as action, sports, puzzles, entertainment, or news. The user may also filter the interaction information 103 displayed using regional controls for displaying interactable items purchased within the regional area selected. Regional controls may include, but are not limited to, selecting cities, states, zip codes, or a current location of the wireless device, or a vicinity thereof, among other regional controls. Moreover, the user may filter the interaction information 103 based upon demographics of the interactable item purchaser, such as age and gender, among other demographics information.

The user may select one or more filters using, for example, a drop down menu, moving a slider from a first point to a second point (e.g., from a high price to a lower price), drawing a circle to include various parameters (e.g., drawing a circle around a regional area), or inputting text to indicate the filter parameters, among other user interface mechanisms for inputting information. Thus, the user may use the options button 114 for tailoring the interaction information 103 displayed on the interaction feed 102 to provide purchasing information more closely related to the user's interests and/or purchasing behaviors.

Figure 2:
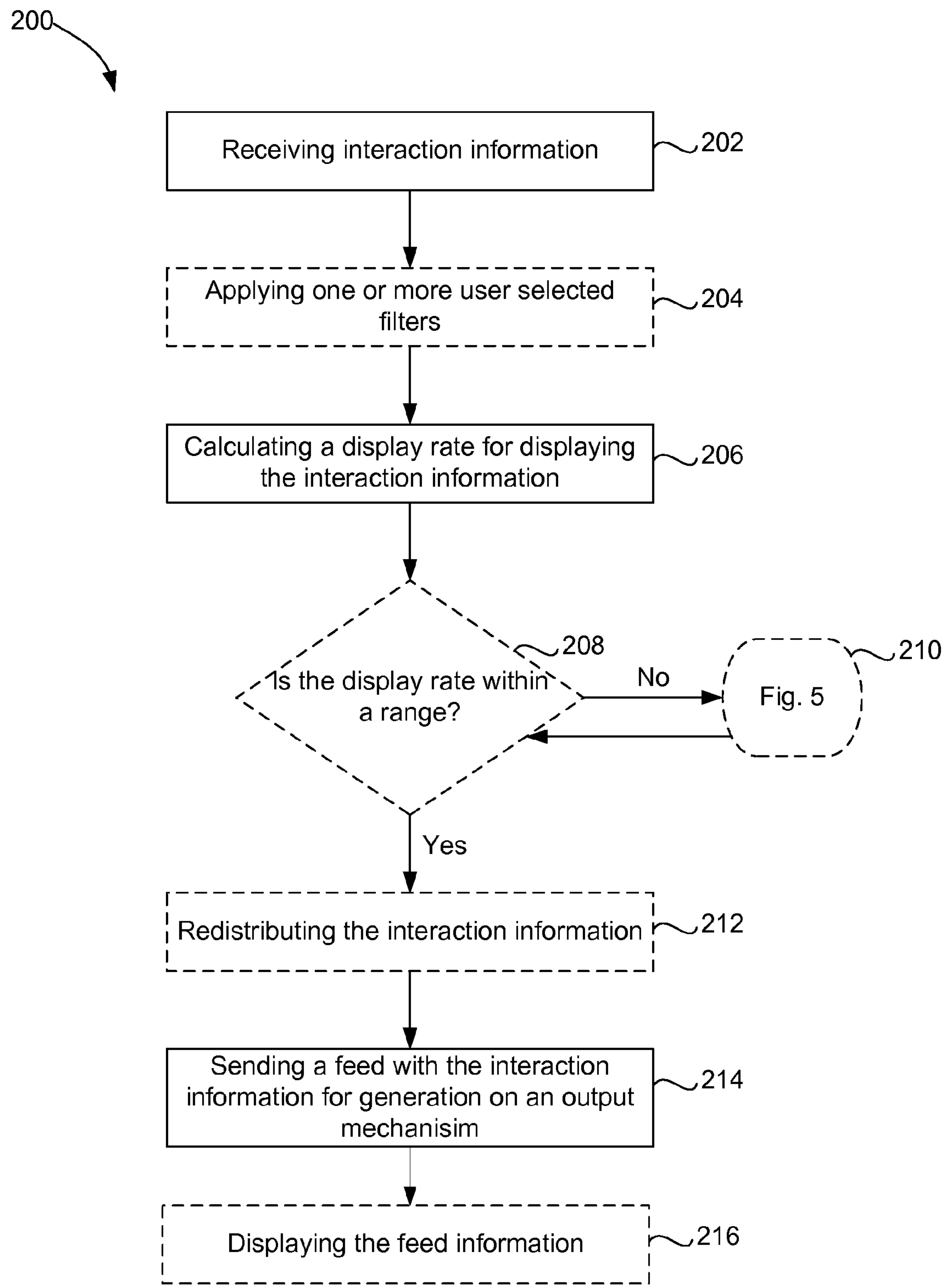
FIG. 2 is an example method flow for presenting a feed in accordance with yet another aspect.

Referring now to FIG. 2, illustrated is an example method flow 200 for presenting a feed in accordance with an aspect. As noted above, the interaction information will be described in the context of an illustrative example relating to displaying interactable item purchase information, however, other interaction information may be substituted or added to this example. Further, the method 200 may be performed by a computer device, such as a wireless device operating on a wireless network or by a network server in communication with one or more wireless devices, or the method 200 may be distributed between the wireless device and the network server. At 202, the method includes receiving interaction information for one or more interactable items. Interaction information may include, but is not limited to, interactable items being purchased, accessed, viewed, shared, recommended, and/or downloaded. In addition, interaction information may also include names describing the interactable items; locations where the interactable items are purchased, accessed, viewed, shared, recommended, and/or downloaded; ratings for the interactable items (e.g., stars or text summarizing data relating to the quality and/or performance of the item for purchase); prices for the interactable items, and suppliers for the interactable items, among other interaction information.

In one aspect, the server may receive the interactable item purchase information when one or more wireless devices purchase one or more interactable items from the server. Thus, as interactable items are being purchased by one or more wireless devices, the server may store in real-time, or near real-time, the purchase information relating to the interactable items being purchased by the wireless devices. In another aspect, the wireless device may receive the interactable item purchase information from the server. Thus, the server and/or the wireless device may receive the interactable item purchase information in real-time or near real-time.

Next, at 204, the method optionally includes applying one or more user selected filters to the received interaction information. As discussed above in FIG. 1, the user may select one or more filters, such as content preferences, regional controls, demographic controls, price filters, rating filters, or purchasing profiles of users who have purchased similar interactable items, among other filters, for controlling the interactable item purchase information displayed. For example, if the user selects interactable items in the genres of social media, news, and weather for display, then the method may include applying the appropriate filters such that only the interactable item purchase information relating to the social media, news and weather interactable items may be used when displaying the interactable item purchase information.

At 206, the method may further include calculating a display rate for displaying the interaction information. The display rate may include, for example, the rate at which the purchase information may be removed and/or added from the purchase feed, e.g., the rate at which the interactable item information scrolls on and/or off the purchase feed. In an aspect, the display rate may be similar to a rate at which the interactable items are purchased. Thus, the display rate may equal the rate at which interactable items are purchased during a configurable time period, such as two seconds. For example, if five interactable items are purchased every two seconds, the display rate would be five interactable items every two seconds. In an aspect, the display rate may be calculated by the sever and/or the wireless device based upon the rate at which interactable items are being purchased.

The method may also include, at 214, sending a feed with the interaction information for generation on an output mechanism. In one aspect, the server may send the interactable item purchase information and display rate to the wireless device as the interactable items are being purchased. In another aspect, the wireless device may send the interactable item purchase information for generation on an output mechanism, such as a display.

At 216, the method may optionally include displaying the interaction information in a feed based upon the display rate. For example, the feed may display the interactable item purchase information based upon the display rate. The wireless device may display the interactable item purchase information at the display rate using a purchase feed (FIG. 1). Therefore, the wireless device may display the interactable item purchase information on the purchase feed in real-time or near real-time.

The method may optionally include, at 208, determining whether the display rate is within a range determined to be suitable for optimal viewing by a user. The range may include, for example, a floor threshold, e.g., a minimum amount of information that may be displayed during a time period, such as two transactions per second, and may also include a ceiling threshold, e.g., a maximum number of information that may be displayed during the time period, such as five transactions per second. The floor and/or ceiling thresholds may be values set based upon previous purchase activities, e.g., the average amount of interactable items purchased over a day.

In addition, the floor and/or ceiling thresholds may be optimized based upon the purchase activity occurring during a time period. For example, if the purchase activity is high during the time period, e.g., ten transactions per second, the floor and ceiling thresholds may increase and/or decrease during the time period to accommodate the additional purchase activity. If the purchase activity, however, drops during the time period, the floor and ceiling thresholds may increase and/or decrease to counter the drop in purchase activity. Thus, the floor and ceiling threshold values may be optimized based upon the purchase activity occurring during a particular time period. The server and/or wireless device may determine, for example, whether the calculated display rate meets the floor threshold and does not exceed the ceiling threshold.

Figure 5:
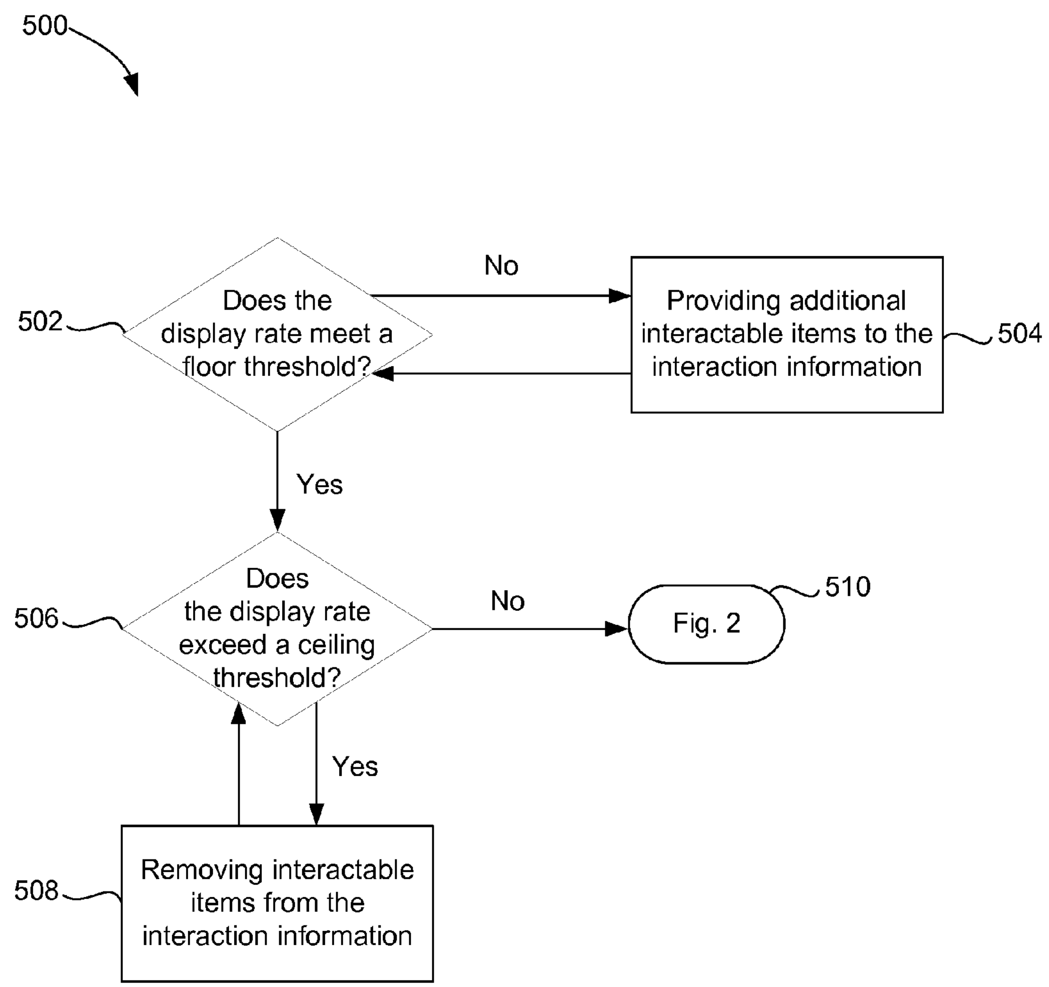
FIG. 5 is an example method flow for adjusting the rate of displaying interaction information in accordance with an aspect.

If the display rate is not within the range, at 210, the method may continue to FIG. 5 for adjusting the display rate. If, however, the display rate is within the display rate range, at 212, the method may optionally include redistributing the interaction information. If, for example, the interaction information is unevenly distributed, e.g., a small number of interactable items account for the majority of interactable items purchased, the method may include redistributing the interaction information. Redistributing the interaction information may include, but is not limited to, removing interactable items from a high purchase area (e.g., interactable items that are frequently downloaded during the time period) and replacing those interactable items with interactable items from a low purchase area (e.g., interactable items that are not as frequently purchased). Thus, the server and/or wireless device may redistribute the interactable item purchase information that may be displayed in the purchase feed illustrating a more even distribution of the interactable items being purchased without the information being skewed by the repetition of a small number of interactable items being frequently purchased. An example of a method for redistributing interaction information is illustrated in FIG. 3.

Figure 3:
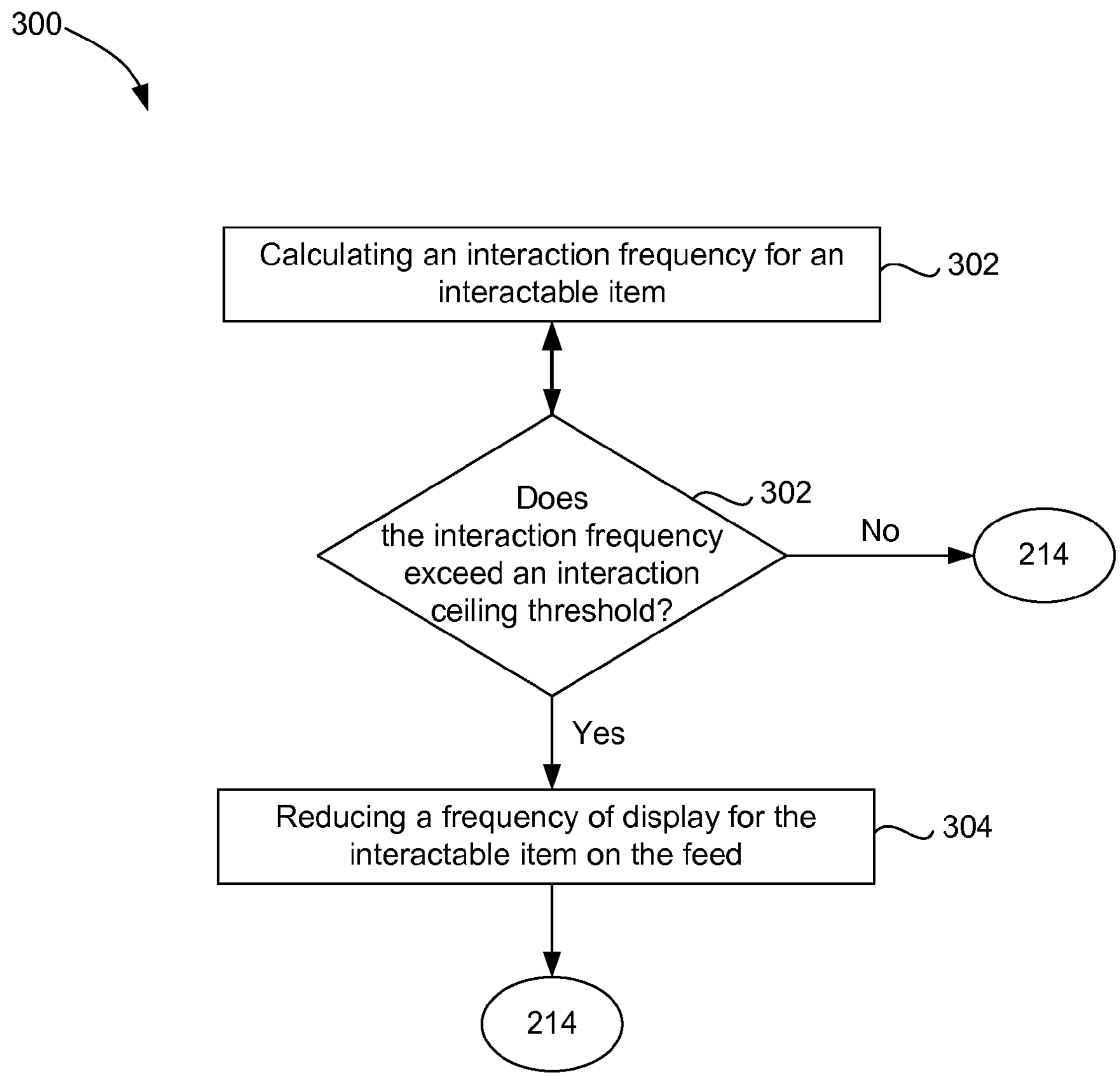
FIG. 3 is an example method flow for redistributing interaction information in accordance with another aspect.

Referring now to FIG. 3, an example method flow 300 for redistributing interaction information in accordance with an aspect includes, at 302, calculating an interaction frequency for an interactable item. The interaction frequency may include, but is not limited to, a total number of purchases for a particular interactable item, such as an application, from one or more wireless devices during a time period. For example, if a game application was purchased eight (8) times within a two second period, the interaction frequency for the game application may be 8. In an aspect, the server and/or wireless device may have a calculator component that increments the interaction frequency for an interactable item each time the particular interactable item is purchased.

At 304, the method may include determining whether the interaction frequency exceeds an interaction ceiling threshold, e.g., a maximum number of occurrences a particular interactable item may be displayed in the feed during a time period. For example, the interaction ceiling threshold may be forty percent (40%) of the total number of interactable items purchased during a time period.

In an aspect, the server and/or wireless device may have an analyzing component operable to compare the interaction frequency for the interactable items purchased during a time period with a total number of interactable items purchased during the time period to determine whether the interaction frequency, e.g., the purchase frequency, for the interactable items exceeds the interaction ceiling threshold. For example, if ten interactable items are purchased during a two second time interval with eight interactable items being for the same game, the analyzing component may determine that the interaction frequency for the game interactable item (e.g., 8 interactable items) exceeds the 40% interaction ceiling threshold.

In an aspect, the interaction ceiling threshold may be optimized based upon the interaction activity occurring during a time period. For example, if the purchase activity is high during the time period, e.g., ten transactions per second, the interaction ceiling threshold may increase during the time period to accommodate the additional purchase activity. If the purchase activity, however, drops during the time period, the interaction ceiling threshold may decrease to counter the drop in purchase activity. Thus, the interaction ceiling threshold value may be optimized based upon the interaction activity occurring during a time period.

If the interaction frequency for a particular interactable item exceeds the interaction ceiling threshold, at 306, the method may include reducing a frequency of display of the interactable items on the purchase feed. In an aspect, the server and/or wireless device may reduce the frequency which a particular interactable item may be displayed on the interactable item purchase feed. For example, if a game interactable item accounts for 80% of the purchase activity during a time period, the server and/or wireless device may reduce the frequency of display for the game interactable item from 80% to 20%. Thus, the purchase feed may display a relative popularity of purchased interactable items by allowing other interactable items to be displayed during the time period without letting popular interactable items overwhelm the purchase feed.

Figure 4:
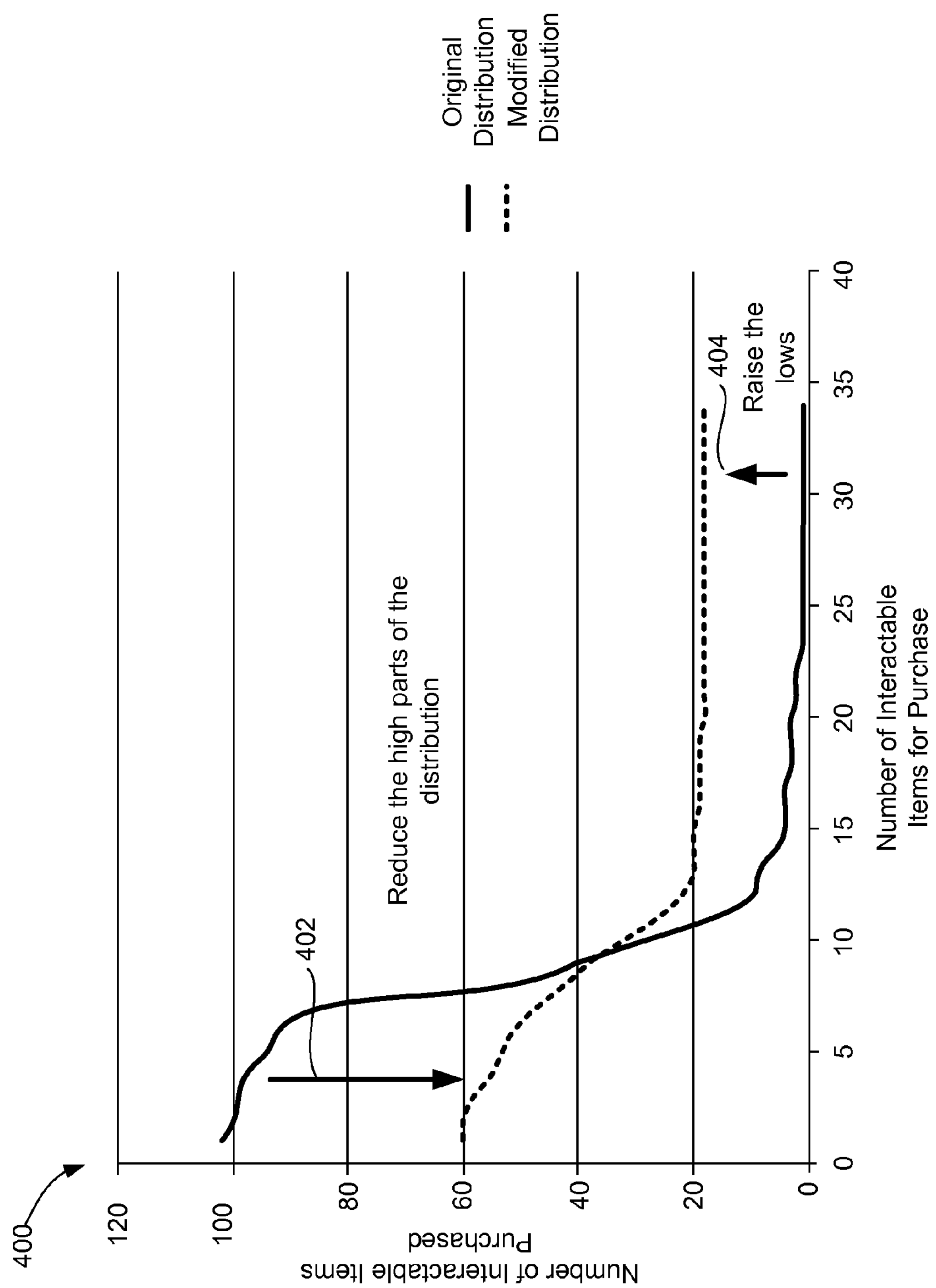
FIG. 4 is a graph comparing the distribution of interactable item information between an original distribution and a modified distribution in accordance with still another aspect.

Referring now to FIG. 4, illustrated is an example graph 400, in accordance with yet another aspect, comparing the distribution of interactable item information between an original distribution, e.g., where the interactable item information has not be redistributed, and a modified distribution, e.g., where the interactable item information has been redistributed. Graph 400 compares the number of purchases for an interactable item on the y-axis versus the number of interactable items for purchase on the x-axis. In the illustrated example, the modified distribution of interactable item purchase information has removed interactable items from the high purchase area 402 and has increased interactable items in the low purchase area 404. Thus, the wireless devices using the modified distribution of interactable item purchase information, as discussed in FIGS. 2 and 3, for example, presents a more even distribution of the total interactable items being purchased without the information being skewed by the repetition of a small number of interactable items that are frequently purchased.

Referring now to FIG. 5, illustrated is an example method flow 500 for adjusting the display rate for displaying interaction information on a feed in accordance with an aspect. At 502, the method may include determining whether the display rate meets a floor threshold, e.g., a minimum amount of information that may be displayed during a time period, such as two transactions per second. As discussed above, the display rate may be similar to the purchase rate. Thus, the server and/or wireless device may compare the rate at which interactable items are being purchased during a time period with the floor threshold to determine whether the number of interactable items purchased during the time period meets the floor threshold.

If the purchase rate does not meet the floor threshold, at 504, the method may include providing additional interactable items to the interaction information. For example, the server and/or wireless device may increase the amount of interactable items purchased during a time period by adding additional interactable items to the interaction information, and thus, increasing the rate of purchase during the time period. In one aspect, a random sampling may be applied for determining the interactable items to add to the interaction information. The interactable items added may be, for example, from an interactable item data store containing interactable items previously purchased. In another aspect, the interactable items added to the interaction information may be interactable items that are not as frequently purchased. Thus, the server and/or wireless device may increase the interaction information being displayed on the feed. The method then continues to 502, until the display rate meets the floor threshold.

If the display rate does meet the floor threshold, at 506, the method may include determining whether the display rate exceeds a ceiling threshold, e.g., a maximum number of information that may be displayed during the time period, such as 5 transactions per second. The server and/or wireless device may compare the rate at which interactable items are purchased during a time period with the ceiling threshold to determine whether the number of interactable items purchased during the time period exceeds the ceiling threshold.

If the purchase rate exceeds the ceiling threshold, at 508, the method may include removing interactable items from the interaction information. For example, the server and/or wireless device may remove interactable items from the interaction information to reduce the rate of display during the time period. Therefore, the display rate is slowed down so that the interaction information does not become blurry by moving too fast on the feed. In one aspect, a random sampling may be applied to the interaction information for determining which interactable items to remove. In another aspect, the interactable items removed may be the interactable items that are frequently purchased. The method then continues to 506, until the display rate does not exceed the ceiling threshold.

If the display rate does not exceed the ceiling threshold, at 510, the method returns to FIG. 2.

Figure 6:
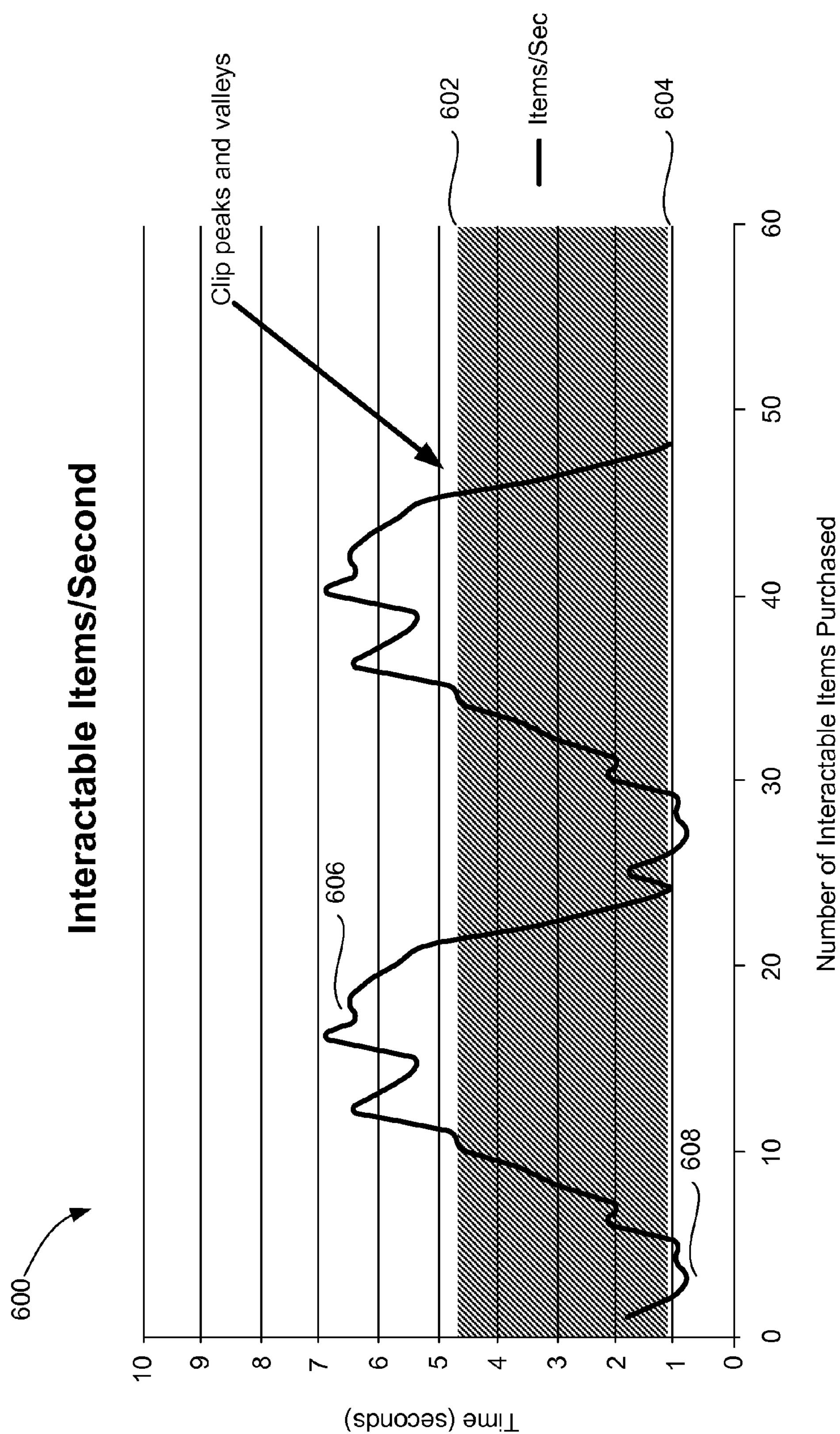
FIG. 6 is a graph illustrating a range for displaying the interactable item purchase information in accordance with an aspect.

Referring now to FIG. 6, illustrated is an example graph 600 indicating a range for displaying the interactable item purchase information in accordance with an aspect. Graph 600 compares the time in seconds on the y-axis versus the number of interactable item purchases on the x-axis. As illustrated, the ceiling threshold 602 for the rate of purchase is 4.8 interactable items per second, while the floor threshold 604 is 1.2 interactable items per second. Thus, using the method described in FIG. 5, the peaks 606 and valleys 608 that fall above and/or below the thresholds 602 and 604 may be clipped (e.g., removing and/or adding interactable items above and below the thresholds, such that the purchase and/or display rate falls within the floor threshold 604 and the ceiling threshold 602). In one aspect, a random sampling may be applied to determine which interactable items to remove and/or add to the interactable item purchase information. In another aspect, the interactable items with a higher purchase frequency may be removed and/or the interactable items with a lower purchase frequency may be added, as discussed in FIGS. 2 and 3.

In one variation, a location filter may also be applied to the interaction information. For example, if a population center, e.g., New York City, accounts for a majority of purchase activity, similar processing as discussed above, may be applied to prevent a single population center from monopolizing the feed. For example, a maximum number of cities per time unit, or a maximum number of times a city may appear in the purchase feed per time unit, may be set by the server, the wireless device, and/or the user.

Figure 7:
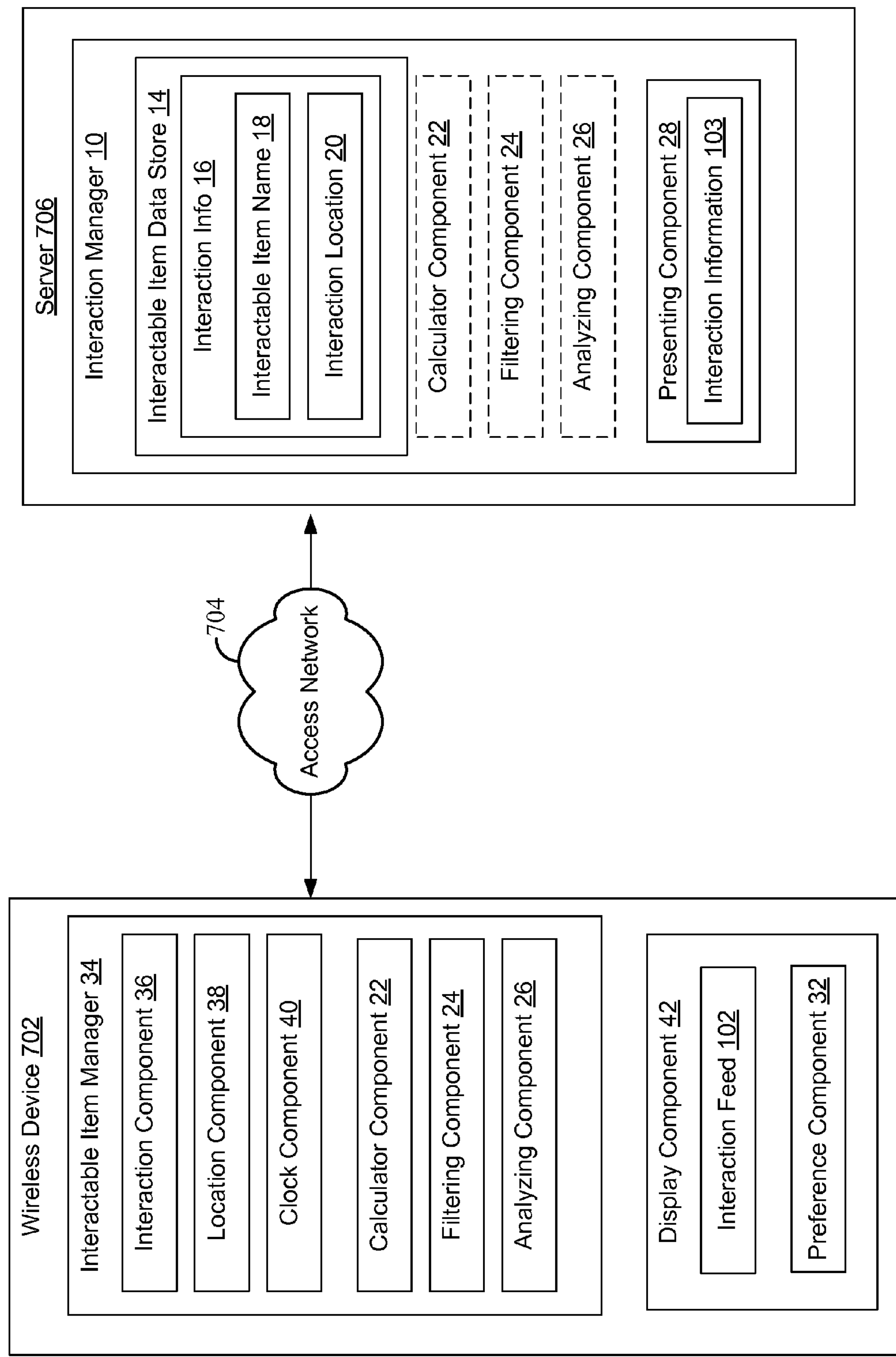
FIG. 7 is an illustration of a connectivity system in accordance with an aspect.

Referring now to FIG. 7, illustrated is an example connectivity system 700 that includes one or more wireless devices 702 communicating through one or more access networks 704 with one or more servers and/or computing devices 706. Wireless device 702 may include any mobile or portable computing or communications device, such as a cellular device, that may connect to an access network 704. Wireless device 702 may be, for example, a cellular telephone, a navigation system, a computing device, a camera, a PDA, a music device, a gaming device or a handheld device having wireless connection capability, among other devices. Server/computing device 706 may include any mobile or fixed computing device connected to a network. Sever/computing device 706 may include, but is not limited to, a computing device, a server, a cellular telephone, a camera, a PDA, a music device, a gaming device, a navigation system, or a handheld device having wireless connection capability, among other devices. Furthermore, access network 704 may provide one or more types of communication connections, such as any type of wireless airlink, to wireless device 702 and server 706.

Wireless device 702 may place and/or receive a communication, e.g., a telephone call, a video conferencing call, an Internet Protocol session, a voice over internet protocol (IP) call, a short message service (SMS) message, a multimedia messaging service (MMS) message, an instant messaging (IM) service message, a chat or net-meeting related connection, a video, music, or data transfer, among other communications, via access network 704 to one or more servers 706. In addition, wireless device 702 may receive a communication via access network 704 from one or more servers 706, or from any other device in communication with access network 704.

Server 706 may include interaction manager 10 which may receive interaction information relating to one or more interactable items from one or more wireless devices or any other device in communication with access network 704. In addition, interaction manager 10 may aggregate the received interaction information for presenting in an interactable item feed. Interactable items may include, but are not limited to, applications, such as social media applications, games, weather applications, news applications, sports applications, or shopping applications, among other applications, and services such as, but not limited to, playing games, viewing television programs, streaming video, or using social media applications, among other services.

Interaction manager 10 may include interactable item data store 14 which may store received interaction information 16. Interaction information 16 may include, but is not limited to, interactable items currently being purchased, accessed, viewed, shared, recommended, and/or downloaded, e.g., in real-time, or almost real-time, among other interaction information. In addition, interactable item data store 14 may also store one or more interactable item names 18 and/or one or more interaction locations 20 where the one or more interaction information 16 occurred, for example. It should be appreciated that server 706 may be receiving interaction information 16 from one or more wireless devices 702 or any other device in communication with access network 704.

Interaction manager 10 may also include a calculator component 22 for calculating the rate for displaying the interaction information 16. In addition, the calculator component 22 may also calculate an interaction frequency for one or more interactable items during a time period. Calculator component 22 may interface with an analyzing component 26 which may analyze the calculated display rate and determine whether the display rate is within a range. In addition, analyzing component 26 may analyze the interaction frequency and determine whether the interaction frequency exceeds an interaction ceiling threshold.

Interaction manager 10 may further include a filtering component 24 for filtering the interaction information 16. Filtering component 24 may interface with calculator component 22 and analyzing component 26 to filter the interaction information 16 for display. For example, if the display rate exceeds the ceiling threshold, filtering component 24 may remove one or more interactable items from the interaction information. In addition, if the display rate does not meet the floor threshold, the filtering component is further operable to add one or more interactable items to the interaction information.

In an aspect, filtering component may interface with preference component 32 on wireless device 702 to filter the interaction information 16 based upon input from wireless device 702. Preference component 32 may receive inputs from the user and/or other wireless device and server components with preferences for filtering the interaction information 16. Preferences may include, but are not limited to, regional controls, demographic controls, price filters, rating filters, and purchasing profiles of users who have purchased similar interactable items, among other preferences. For example, preference component 32 may receive inputs from other wireless device and server components, such as, but not limited to, a memory or database, a clock, a position location module, a camera, a microphone, a wired or wireless communication interface, a keypad, or a touch sensitive display, among others sources of inputs.

In addition, interaction manager 10 may also include a presenting component 28 which may forward interaction information 103 to wireless device 702, for example, for generation on an output mechanism. Output mechanisms may include, for example, a display, an interface, and a speaker, among other output mechanisms. In an aspect, server 706 may forward interaction information 103 to one or more wireless devices 702 through a unicast message. In another aspect, server 706 may forward interaction information 103 to wireless device 702 through a multicast message. For example, server 706 may forward a really simple syndication (RSS) feed to one or more wireless devices 702 with the interaction information 103.

Interaction information 103 may include, but is not limited to, interaction information 16, interactable item names 18, and interaction locations 20, among other interaction information. For example, presenting component 28 may interface with filtering component 24, analyzing component 26, and interactable item data store 14 to determine the interactable item and interaction information that should be included with interaction information 103 for display. Thus, it should be appreciated that interaction information 103 sent to wireless device 702 may include a subset of the total interaction information 16 instead of presenting an entire list of the interaction information 16.

Referring now to wireless device 702, wireless device 702 may include interactable item manager 34 operable for receiving interaction information for interactable items currently being purchased, accessed, viewed, shared, recommended, and/or downloaded, e.g., in real-time, or almost real-time, among other interaction information. In addition, interactable item manager 34 may be operable to forward received interaction information from one or more components on wireless device 702 to interaction manager 10.

Interactable item manager 34 may include an interaction component 36 for purchasing, accessing, viewing, sharing, recommending and/or downloading one or more interactable items. In addition, interactable item manager 34 may have a location component 38 which may interface with interaction component 36 to determine the location of wireless device 702 when a particular interaction occurred for one or more interactable items. Location component 38 may be, for example, a Global Positioning System (GPS) module that generates latitude and longitude coordinates indicating the location of wireless device 702. Interactable item manager 34 may also include a clock component 40 which may interface with interaction component 36 to determine the time and/or date when a particular interaction occurred for one or more interactable items.

In addition, wireless device 702 may have a display component 42 for displaying interaction feed 102. Display component 42 may also have a preference component 32 for receiving inputs from the user and/or other wireless device and server components with preferences for filtering the interaction information 103.

Wireless device 702 may also include calculator component 22, filtering component 24 and analyzing component 26, as discussed above in regards to server 706. In an aspect, wireless device 702 may filter interaction information 103 according to device specific parameters. For example, if the display of the wireless device is small in size, calculator component 22 may calculate a lower interaction frequency for display on the wireless device and filtering component 24 may filter the interaction information 103 based upon the calculated interaction frequency for display. Thus, each wireless device 702 may adjust the display rate of the received interaction information 103 according to the wireless devices' specific parameters. In addition, it should be appreciated that the interaction information 103 that is displayed on wireless device 702 may be a subset of the entire interaction information 103 based upon the one or more filters that may be applied to interaction information 103.

It should be appreciated that while the features of interaction manager 10 have been described as residing on server 706, in another aspect, the features of interaction manager 10 may be included on wireless device 702.

Figure 8:
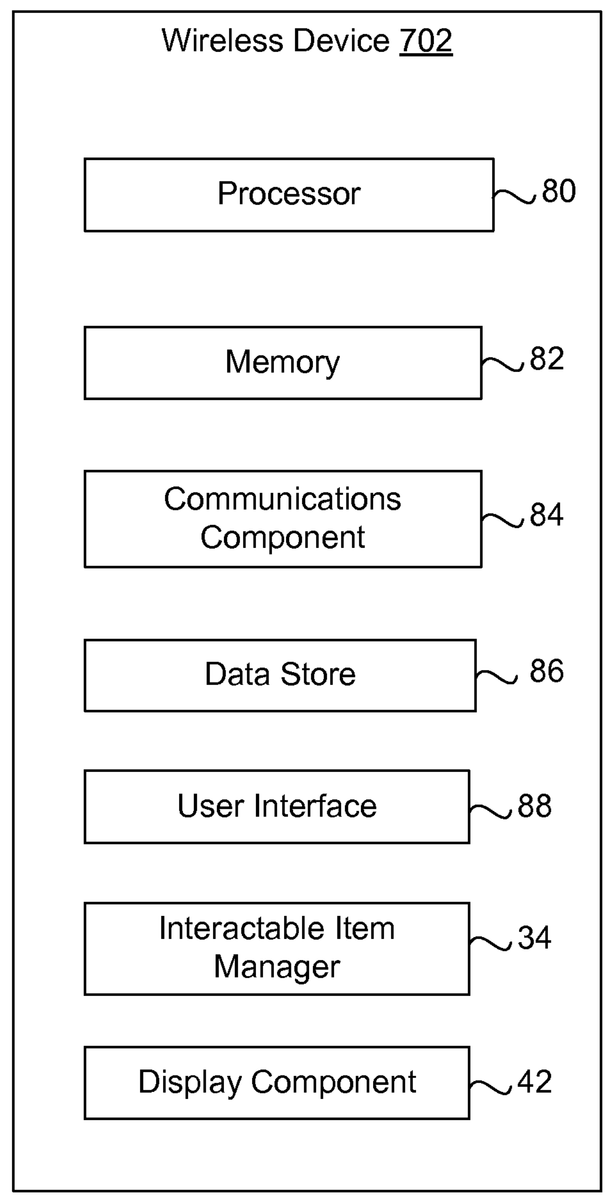
FIG. 8 is an example wireless device operable within the connectivity system in accordance with an aspect.

Referring now to FIG. 8, illustrated is an example wireless device 702 operable within the connectivity system in accordance with an aspect. In one aspect, wireless device 702 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 702 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 702 includes a communications component 84 that provides for establishing and maintaining communications with one or more parties utilizing hardware, software, and services as described herein. Communications component 84 may carry communications between components on wireless device 702, as well as between wireless device 702 and external devices, such as devices located across a communications network and/or devices serially or locally connected to wireless device 702. For example, communications component 84 may include one or more buses, and may further include transmit chain components and receive chain components associated with a transmitter and receiver, respectively, operable for interfacing with external devices.

Additionally, wireless device 702 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 702 may additionally include a user interface component 88 operable to receive inputs from a user of wireless device 702 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 702 may also include interactable item manager 34 operable to receive and forward interaction information for interactable items. Wireless device 702 may further include a display component 42 operable to display interactable item interaction information. In an aspect, interface component 88 may transmit and/or receive messages corresponding to the operation of interactable item manager 34 and display component 42, such as interaction feed 102. In addition, processor 80 executes interactable item manager 34 and display component 42, and memory 82 may store them.

Figure 9:
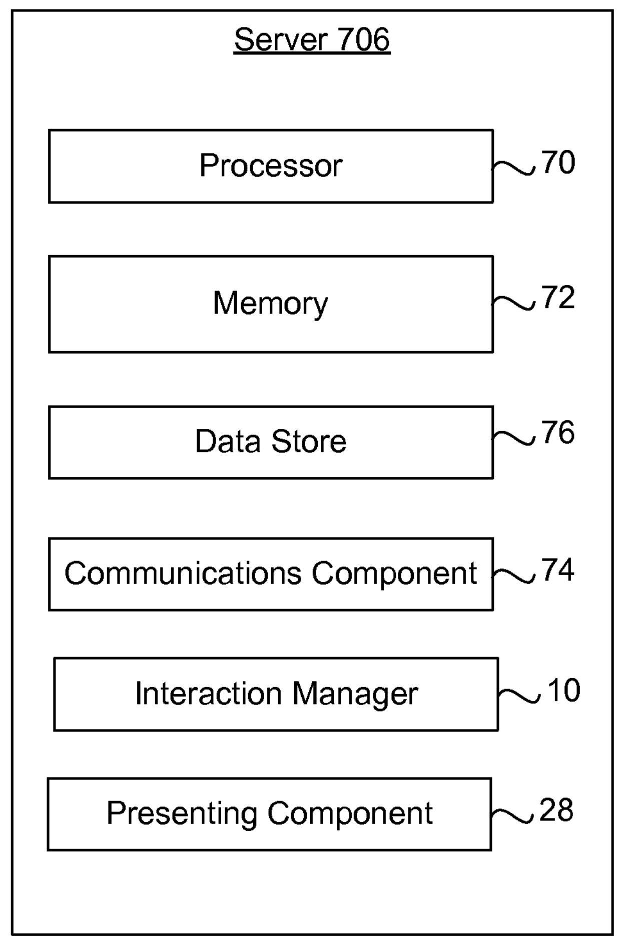
FIG. 9 is an example server device operable within the connectivity system in accordance with yet another aspect.

Referring now to FIG. 9, illustrated is an example server device 706 operable within the connectivity system in accordance with yet another aspect. Server 706 manages network connectivity matters for access network 704. Server 706 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 706 further includes a memory 72, such as for storing local versions of applications being executed by processor component 70. Memory 72 can include random access memory (RAM), read only memory (ROM), and a combination thereof.

Further, server 706 includes a communications component 74 that provides for establishing and maintaining communications with one or more parties utilizing hardware, software, and services as described herein. Communications component 74 may carry communications between components on server 706, as well as between server 706 and external devices, such as devices located across a communications network and/or devices serially or locally connected to server 706.

Additionally, server 706 may further include a data store 76, which can be any suitable combination of hardware and/or software, that provides for mass storage of information, databases, and programs employed in connection with aspects described herein. For example, data store 76 may be a data repository for applications not currently executing. Server 706 may also include interaction manager 10 operable to receive interactable item information and aggregate the received interactable item information for display in an interactable item feed. In addition, server 706 may include presenting component 28 operable to forward feed information for display. In an aspect, communications component 74 may transmit and/or receive messages corresponding to the operation of interaction manager 10 and presenting component 28, such as interaction feed 102. In addition, processor 70 may execute interaction manager 10 and presenting component 28, and memory 72 may store them.

Figure 10:
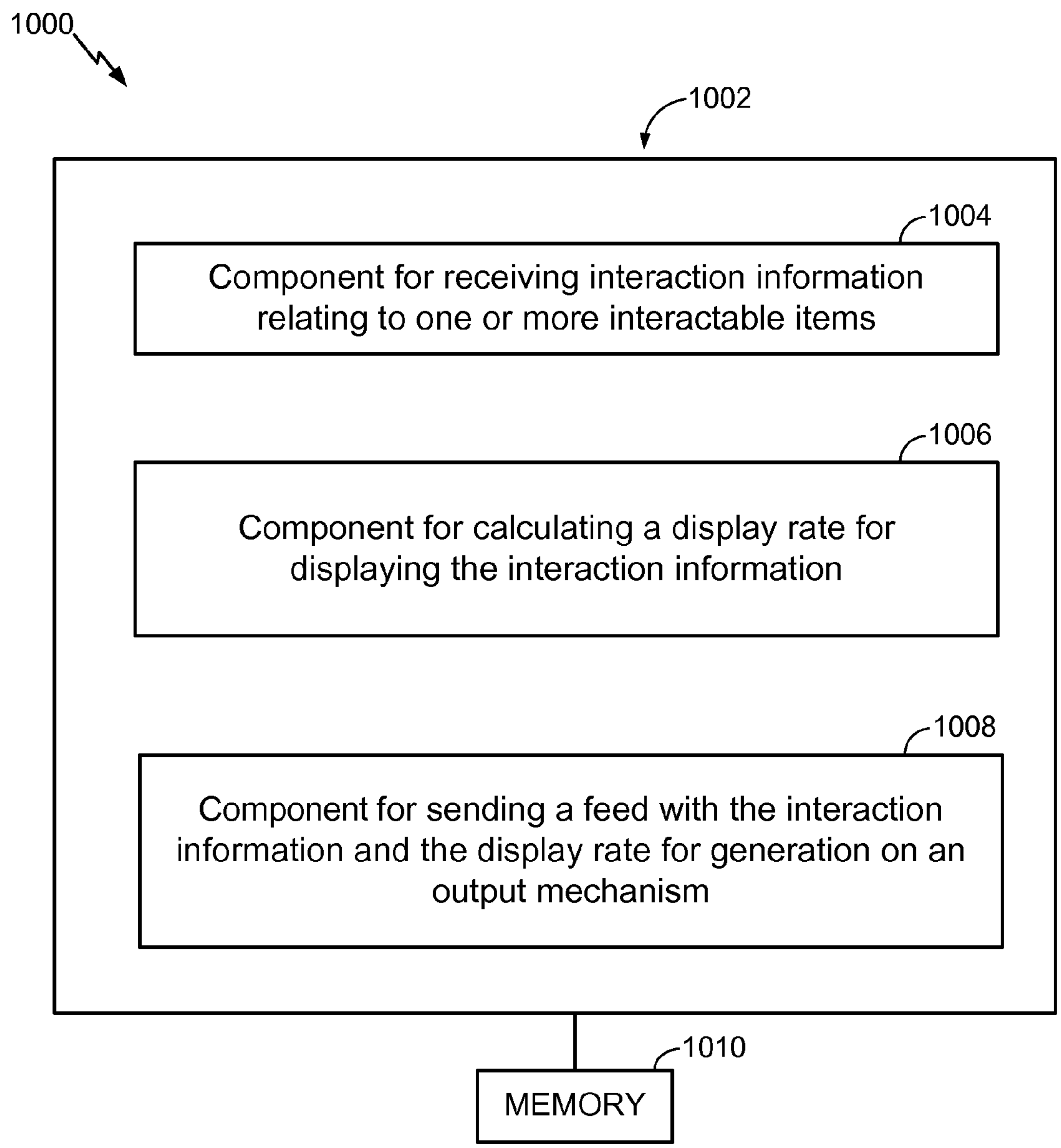
FIG. 10 is an illustration of an example system that facilitates presenting interaction information relating to one or more interactable items.

Referring now to FIG. 10, illustrated is a system 1000 configured to presenting interactable item information relating to interactable items. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate presenting interactable item information relating to interactable items. For instance, logical grouping 1002 may include component 1004 for receiving interaction information relating to one or more interactable items. Further, logical grouping 1002 may comprise component 1006 for calculating a display rate for displaying the interaction information. In addition, logical grouping 1002 may include component 1008 for sending a feed with the interaction information and the display rate for generation on an output mechanism. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

One variation may include applying the above methods and systems to online shopping. For example, when users are shopping online from a personal computer, it may be difficult to ascertain what products other users are currently purchasing. Thus, a purchase feed may be displayed, as discussed above, illustrating what other consumers are currently purchasing from the online store.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In the subject disclosure, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or embodiment, unless stated otherwise.

What is claimed is:

1. A method for presenting interaction information, the method comprising:

receiving, at a computer, interaction information relating to interactions with one or more interactable items;

calculating a display rate for displaying the interaction information, wherein the display rate is based upon a number of the interactions with the one or more interactable items occurring during a time period;

determining whether the display rate is within a range suitable for viewing;

sending a feed with the interaction information and the display rate for generation on an output mechanism in response to determining that the display rate is within the range;

removing one or more interactable items from the interaction information in response to determining that the display rate is not within the range and further determining that the display rate exceeds a ceiling threshold; and adding one or more interactable items to the interaction information in response to determining that the display rate is not within the range and further determining that the display rate does not meet a floor threshold.

2. The method of claim 1, wherein removing one or more interactable items from the interaction information is based upon a frequency of the interactable items in the interaction information.

3. The method of claim 1, wherein adding one or more interactable items to the interaction information is based upon a frequency of the interactable items in the interaction information.

4. The method of claim 1, further comprising:

redistributing the interaction information.

5. The method of claim 1, wherein the interaction information comprises a number of interactable items being purchased, and wherein calculating the display rate is based upon the number of interactable items being purchased during the time period.

6. The method of claim 1, wherein the interaction information comprises a number of interactable items being accessed, and wherein calculating the display rate is based upon the number of interactable items being accessed during the time period.

7. The method of claim 1, wherein the interaction information comprises a number of interactable items being viewed, and wherein calculating the display rate is based upon the number of interactable items being viewed during the time period.

8. The method of claim 1, wherein the interaction information comprises a number of interactable items being downloaded, and wherein calculating the display rate is based upon the number of interactable items being downloaded during the time period.

9. The method of claim 1, wherein the interaction information comprises a number of interactable items being shared, and wherein calculating the display rate is based upon the number of interactable items being shared during the time period.

10. The method of claim 1, wherein the interaction information comprises a number of interactable items being recommended, and wherein calculating the display rate is based upon the number of interactable items being recommended during the time period.

11. The method of claim 1, wherein the computer comprises a wireless device, and wherein the method further comprises presenting the interaction information at the display rate.

12. The method of claim 1, wherein the computer comprises a network server, wherein the sending further comprises sending to one or more wireless devices.

13. The method of claim 1, further comprising displaying the feed on a display of a wireless device.

14. A method for presenting interaction information, the method comprising:

receiving, at a computer, interaction information relating to interactions with one or more interactable items;

calculating a display rate for displaying the interaction information, wherein the display rate is based upon a number of the interactions with the one or more interactable items occurring during a time period;

sending a feed with the interaction information and the display rate for generation on an output mechanism; and redistributing the interaction information, wherein redistributing the interaction information further comprises:

calculating an interaction frequency for an interactable item from the one or more interactable items during the time period; and reducing a frequency of display of the interactable item in response to determining that the interaction frequency exceeds the interaction ceiling threshold.

15. The method of claim 14, wherein the interaction frequency is based upon a number of the interactable items being purchased during the time period.

16. The method of claim 14, wherein the interaction ceiling threshold is a percentage of a total number of interactable items purchased during the time period.

17. A method for presenting interaction information, the method comprising:

receiving, at a computer, interaction information relating to interactions with one or more interactable items, wherein the interaction information comprises a number of interactable items being deleted;

calculating a display rate for displaying the interaction information, wherein the display rate is based upon a number of the interactions with the one or more interactable items occurring during a time period, and wherein calculating the display rate is based upon the number of interactable items being deleted during the time period; and sending a feed with the interaction information and the display rate for generation on an output mechanism.

18. At least one processor configured to present interactable item information, the processor comprising:

a first module configured to receive interaction information relating to interactions with one or more interactable items;

a second module configured to calculate a display rate for displaying the interaction information, wherein the display rate is based upon a number of the interactions with the one or more interactable items occurring during a time period;

a third module configured to determine whether the display rate is within a range suitable for viewing;

a fourth module configured to send a feed with the interaction information and the display rate for generation on an output mechanism in response to the display rate being within the range;

a fifth module configured to remove one or more interactable items from the interaction information in response to the display rate not being within the range and the display rate exceeding a ceiling threshold; and a sixth module configured to add one or more interactable items to the interaction information in response to the display rate not being within the range and the display rate not meeting a floor threshold.

19. A computer program product, comprising:

a non-transitory computer-readable medium comprising:

at least one instruction for causing a computer to receive interaction information relating to interactions with one or more interactable items;

at least one instruction for causing the computer to calculate a display rate for displaying the interaction information, wherein the display rate is based upon a number of the interactions with the one or more interactable items occurring during a time period;

at least one instruction for causing the computer to determine whether the display rate is within a range suitable for viewing;

at least one instruction for causing the computer to send a feed with the interaction information and the display rate for generation on an output mechanism in response to the display rate being within the range;

at least one instruction for causing the computer to remove one or more interactable items from the interaction information in response to the display rate not being within the range and the display rate exceeding a ceiling threshold; and at least one instruction for causing the computer to add one or more interactable items to the interaction information in response to the display rate not being within the range and the display rate not meeting a floor threshold.

20. An apparatus comprising:

means for receiving, at a computer, interaction information relating to interactions with one or more interactable items;

means for calculating a display rate for displaying the interaction information, wherein the display rate is based upon a number of the interactions with the one or more interactable items occurring during a time period;

means for determining whether the display rate is within a range suitable for viewing;

means for sending a feed with the interaction information and the display rate for generation on an output mechanism in response to the display rate being within the range;

means for removing one or more interactable items from the interaction information in response to the display rate not being within the range and the display rate exceeding a ceiling threshold; and means for adding one or more interactable items to the interaction information in response to the display rate not being within the range and the display rate not meeting a floor threshold.

21. An apparatus for presenting interactable item information, the apparatus comprising:

an interaction component operable to receive interaction information relating to interactions with one or more interactable items;

a calculator component operable to calculate a display rate for displaying the interaction information, wherein the display rate is based upon a number of the interactions with the one or more interactable items occurring during a time period;

an analyzing component operable to determine whether the display rate is within a range suitable for viewing and to determine whether the display rate meets a floor threshold or exceeds a ceiling threshold in response to the display rate not being within the range;

a presenting component operable to send a feed with the interaction information and the display rate for generation on an output mechanism in response to the display rate being within the range; and a filtering component operable to remove one or more interactable items from the interaction information in response to the display rate not being within the range and the display rate exceeding the ceiling threshold and to add one or more interactable items to the interaction information in response to the display rate not being within the range and the display rate not meeting the floor threshold.

22. The apparatus of claim 21, wherein the filtering component is further operable to remove the one or more interactable items from the interaction information based upon a frequency of the interactable items in the interaction information.

23. The apparatus of claim 21, wherein the filtering component is further operable to add the one or more interactable items to the interaction information based upon a frequency of the interactable items in the interaction information.

24. The apparatus of claim 21, wherein:

the analyzing component is further operable to redistribute the interaction information.

25. The apparatus of claim 21, wherein the interaction information comprises a number of interactable items being purchased, and wherein the calculator component is operable to calculate the display rate based upon the number of interactable items being purchased during the time period.

26. The apparatus of claim 21, wherein the interaction information comprises a number of interactable items being accessed, and wherein the calculator component is operable to calculate the display rate based upon the number of interactable items being accessed during the time period.

27. The apparatus of claim 21, wherein the interaction information comprises a number of interactable items being viewed, and wherein the calculator component is operable to calculate the display rate based upon the number of interactable items being viewed during the time period.

28. The apparatus of claim 21, wherein the interaction information comprises a number of interactable items being downloaded, and wherein the calculator component is operable to calculate the display rate based upon the number of interactable items being downloaded during the time period.

29. The apparatus of claim 21, wherein the interaction information comprises a number of interactable items being shared, and wherein the calculator component is operable to calculate the display rate based upon the number of interactable items being shared during the time period.

30. The apparatus of claim 21, wherein the interaction information comprises a number of interactable items being recommended, and wherein the calculator component is operable to calculate the display rate based upon the number of interactable items being recommended during the time period.

31. The apparatus of claim 21, wherein the apparatus comprises a wireless device, and wherein the presenting component is further operable to present the interaction information at the display rate.

32. The apparatus of claim 21, wherein the apparatus comprises a network server, and wherein the presenting component is further operable to send the feed to one or more wireless devices.

33. The apparatus of claim 21, further comprising a display component operable to display the feed on a display of a wireless device.

34. An apparatus for presenting interactable item information, the apparatus comprising:

an interaction component operable to receive interaction information relating to interactions with one or more interactable items;

a calculator component operable to calculate a display rate for displaying the interaction information, wherein the display rate is based upon a number of the interactions with the one or more interactable items occurring during a time period, wherein the calculator component is further operable to calculate an interaction frequency for an interactable item from the one or more interactable items during the time period;

a presenting component operable to send a feed with the interaction information and the display rate for generation on an output mechanism;

an analyzing component operable to redistribute the interaction information and to determine whether the interaction frequency exceeds an interaction ceiling threshold; and a filtering component operable to reduce a frequency of display of the interactable item in response to the interaction frequency exceeding the interaction ceiling threshold.

35. The apparatus of claim 34, wherein the interaction frequency is based upon a number of the interactable items being purchased during the time period.

36. The apparatus of claim 34, wherein the interaction ceiling threshold is a percentage of a total number of interactable items purchased during the time period.

37. An apparatus for presenting interactable item information, the apparatus comprising:

an interaction component operable to receive interaction information relating to interactions with one or more interactable items, wherein the interaction information comprises a number of interactable items being deleted;

a calculator component operable to calculate a display rate for displaying the interaction information, wherein the display rate is based upon a number of the interactions with the one or more interactable items occurring during a time period, and wherein the calculator component is operable to calculate the display rate based upon the number of interactable items being deleted during the time period; and a presenting component operable to send a feed with the interaction information and the display rate for generation on an output mechanism.

38. At least one processor configured to present interactable item information, the processor comprising:

a first module configured to receive interaction information relating to interactions with one or more interactable items;

a second module configured to calculate a display rate for displaying the interaction information, wherein the display rate is based upon a number of the interactions with the one or more interactable items occurring during a time period;

a third module configured to send a feed with the interaction information and the display rate for generation on an output mechanism; and a fourth module configured to redistribute the interaction information, wherein the fourth module is further configured to:

calculate an interaction frequency for an interactable item from the one or more interactable items during the time period; and reduce a frequency of display of the interactable item in response to the calculated interaction frequency exceeding an interaction ceiling threshold.

39. At least one processor configured to present interactable item information, the processor comprising:

a first module configured to receive interaction information relating to interactions with one or more interactable items, wherein the interaction information comprises a number of interactable items being deleted;

a second module configured to calculate a display rate for displaying the interaction information, wherein the display rate is based upon a number of the interactions with the one or more interactable items occurring during a time period, and wherein the second module is further configured to calculate the display rate based upon the number of interactable items being deleted during the time period; and a third module configured to send a feed with the interaction information and the display rate for generation on an output mechanism.

40. A computer program product, comprising:

a non-transitory computer-readable medium comprising:

at least one instruction for causing a computer to receive interaction information relating to interactions with one or more interactable items;

at least one instruction for causing the computer to calculate a display rate for displaying the interaction information, wherein the display rate is based upon a number of the interactions with the one or more interactable items occurring during a time period;

at least one instruction for causing the computer to send a feed with the interaction information and the display rate for generation on an output mechanism;

at least one instruction for causing the computer to calculate an interaction frequency for an interactable item from the one or more interactable items during the time period; and at least one instruction for causing the computer to reduce a frequency of display of the interactable item in response to the calculated interaction frequency exceeding an interaction ceiling threshold.

41. A computer program product, comprising:

a non-transitory computer-readable medium comprising:

at least one instruction for causing a computer to receive interaction information relating to interactions with one or more interactable items, wherein the interaction information comprises a number of interactable items being deleted;

at least one instruction for causing the computer to calculate a display rate for displaying the interaction information, wherein the display rate is based upon a number of the interactions with the one or more interactable items occurring during a time period, and wherein the at least one instruction for causing the computer to calculate the display rate further causes the computer to calculate the display rate based upon the number of interactable items being deleted during the time period; and at least one instruction for causing the computer to send a feed with the interaction information and the display rate for generation on an output mechanism.

42. An apparatus, comprising:

means for receiving, at a computer, interaction information relating to interactions with one or more interactable items;

means for calculating a display rate for displaying the interaction information, wherein the display rate is based upon a number of the interactions with the one or more interactable items occurring during a time period;

means for sending a feed with the interaction information and the display rate for generation on an output mechanism;

means for calculating an interaction frequency for an interactable item from the one or more interactable items during the time period; and means for reducing a frequency of display of the interactable item in response to the calculated interaction frequency exceeding an interaction ceiling threshold.

43. An apparatus, comprising:

means for receiving, at a computer, interaction information relating to interactions with one or more interactable items, wherein the interaction information comprises a number of interactable items being deleted;

means for calculating a display rate for displaying the interaction information, wherein the display rate is based upon a number of the interactions with the one or more interactable items occurring during a time period, and wherein the means for calculating the display rate is further configured for calculating the display rate based upon the number of interactable items being deleted during the time period; and means for sending a feed with the interaction information and the display rate for generation on an output mechanism.

* * * * *